United States Patent Office.

THOMAS CUMMINGS, OF LANCASTER, PENNSYLVANIA.

Letters Patent No. 104,937, dated July 5, 1870.

COMPOSITION FOR PHOTOGRAPHIC PURPOSES.

The Schedule referred to in these Letters Patent and making part of the same.

I, THOMAS CUMMINGS, of Lancaster, in the county of Lancaster and State of Pennsylvania, have invented a certain Composition or Process for Photographic purposes, of which the following is a specification.

The object of my invention is to overcome the resistance of the varnish to taking color kindly, when applied with the brush or lead-pencil in retouching negatives, so much in vogue, as well as to produce the beautiful effect of a stippeled picture, heretofore only attained by the use of glass, having one side previously ground with emery, or otherwise.

The nature of my invention consists in the use of finely pulverized glass, or its equivalent, in combination with varnish, when applied to photographic purposes.

In experimenting, I have found the happiest results in having glass reduced to a very fine powder, and carefully sifted, or mixed with the ordinary varnish in use, and allowed to stand till the coarser particles settle, and then decanted and well shaken up. When applied to a negative photograph, this produces the desired surface, needs no grinding or rubbing, so as to roughen up or remove the resistance to the color or Indian-ink, used in retouching before printing from them, but can be used at once, with perfect satisfaction, and not only saves time, but produces also the most pleasing result, by presenting that soft stippling effect in the lights and shadows, which renders the pictures printed from such varnished pictures truly desirable.

The very finely powdered glass might also be blown or strewn (if it can be done uniformly) directly on the varnished surface, before it is set, but I prefer it mixed with the varnish, say half an ounce of powdered glass to four fluid ounces of varnish, or any transparent glutinous medium that may be employed instead of the varnish, when the same or similar proportions are used. To produce any desired effect the proportions may be varied.

I confine my invention to photography, and believe the application of finely ground glass, or its equivalent, to varnish or a varnished surface of a negative picture, to be new.

What I claim is—

The use of finely pulverized glass, or its equivalent, in combination with varnish, when applied for photographic purposes, substantially in the manner and for the purpose specified.

THOS. CUMMINGS.

Witnesses:
   WM. B. WILEY,
   JACOB STAUFFER.